(12) United States Patent
Tang et al.

(10) Patent No.: US 11,872,542 B2
(45) Date of Patent: Jan. 16, 2024

(54) CATALYST SUBSTRATE COMPRISING RADIALLY-ZONED COATING

(71) Applicant: BASF CORPORATION, Florham Park, NJ (US)

(72) Inventors: Weiyong Tang, Shanghai (CN); Sandip D. Shah, East Brunswick, NJ (US); Andreas R. Munding, Madison, AL (US); Fabien A. Rioult, Garwood, NJ (US); Ramesh Murlidhar Kakwani, Union, IA (US)

(73) Assignee: BASF Corporation

( * ) Notice: Subject to any disclaimer, the term of this patent is extended or adjusted under 35 U.S.C. 154(b) by 0 days.

(21) Appl. No.: 17/626,135

(22) PCT Filed: Jul. 9, 2020

(86) PCT No.: PCT/US2020/041297
§ 371 (c)(1),
(2) Date: Jan. 11, 2022

(87) PCT Pub. No.: WO2021/011272
PCT Pub. Date: Jan. 21, 2021

(65) Prior Publication Data
US 2022/0258137 A1 Aug. 18, 2022

Related U.S. Application Data

(60) Provisional application No. 62/873,600, filed on Jul. 12, 2019.

(51) Int. Cl.
*B01J 21/04* (2006.01)
*B01J 23/42* (2006.01)
*B01J 23/44* (2006.01)
*F01N 3/20* (2006.01)

(52) U.S. Cl.
CPC .............. *B01J 23/44* (2013.01); *B01J 21/04* (2013.01); *B01J 23/42* (2013.01); *F01N 3/2066* (2013.01); *F01N 2570/10* (2013.01); *F01N 2570/12* (2013.01); *F01N 2570/14* (2013.01)

(58) Field of Classification Search
CPC .. B01J 23/44; B01J 21/04; B01J 23/42; F01N 3/2066; F01N 2570/10; F01N 2570/12; F01N 2570/14; B01D 46/2418; B01D 46/2455; B01D 53/9413; B01D 53/9454; B01D 53/9472; B01D 2255/102; B01D 2255/9022; B01D 2255/9032; B01D 2255/9155; B01D 2258/012
See application file for complete search history.

(56) References Cited

U.S. PATENT DOCUMENTS

| 6,171,556 | B1 | 1/2001 | Burk et al. |
| 9,757,675 | B2 | 9/2017 | He et al. |
| 2004/0001782 | A1 | 1/2004 | Kumar et al. |
| 2011/0132194 | A1 | 6/2011 | Ahmed et al. |
| 2014/0271429 | A1* | 9/2014 | Kazi ................... B01J 23/58 502/328 |
| 2019/0105636 | A1 | 4/2019 | Wang et al. |

FOREIGN PATENT DOCUMENTS

| CN | 1 671 471 A | * | 9/2005 | .............. B01J 23/44 |
| WO | 2016/070090 A1 | | 5/2016 | |
| WO | 2017/003981 A1 | | 1/2017 | |
| WO | WO 2020/201953 A1 | * | 10/2020 | .............. B01D 53/94 |

OTHER PUBLICATIONS

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.
International Search Report for PCT Patent Application No. PCT/US2020/041297, dated Oct. 16, 2020, 3 pages.

* cited by examiner

*Primary Examiner* — Timothy C Vanoy
(74) *Attorney, Agent, or Firm* — Baltazar Gomez; ECMS Global Intellectual Property

(57) ABSTRACT

A catalyst article is provided including a substrate including a plurality of passageways, and further including a first and a second oxidation region including a first and a second subset of said plurality of passageways. A first catalyst composition is coating at least a portion of each passageway of the first oxidation region and positioned as a sole PGM-containing catalyst layer, or a zoned portion thereof, or as a top PGM-containing catalyst layer, or a zoned portion thereof, in the first oxidation region. A second catalyst composition is coating at least a portion of each passageway of the second oxidation region and positioned as a sole PGM-containing catalyst layer, or a zoned portion thereof, or as a top PGM-containing catalyst layer, or a zoned portion thereof, in the second oxidation region. The Pt:Pd weight ratio is greater in the first catalyst composition than in the second catalyst composition.

20 Claims, 9 Drawing Sheets

CATALYST SUBSTRATE COMPRISING RADIALLY-ZONED COATING

CROSS-REFERENCE TO RELATED APPLICATIONS

This application is a national stage filing under 35 U.S.C. 371 of PCT/US2020/041297, filed on Jul. 9, 2020, which claims the benefit of priority to U.S. Provisional Application No. 62/873,600, filed on Jul. 12, 2019, which applications are hereby incorporated in their entirety by reference in this application.

FIELD OF THE INVENTION

The present invention is directed to catalyst compositions suitable for treating exhaust gas streams of an internal combustion engine, for example, a diesel engine, as well as to catalytic articles and systems incorporating such compositions and methods of making and using the same.

BACKGROUND OF THE INVENTION

Emissions of diesel engines include particulate matter (PM), nitrogen oxides ($NO_x$), unburned hydrocarbons (HC), and carbon monoxide (CO). NO is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Catalysts containing platinum group metals (PGM) are useful in treating the exhaust of diesel engines to convert hydrocarbon and carbon monoxide by catalyzing the oxidation of these pollutants to carbon dioxide and water. In addition, oxidation catalysts that contain platinum promote the oxidation of NO to $NO_2$. For heavy-duty diesel systems, such catalysts are generally contained within diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, diesel oxidation catalysts are deposited on ceramic or metallic substrates. For additional reduction of NOx species, such systems also typically include an at least one Selective Catalytic Reduction (SCR) catalyst downstream from the DOC catalyst. In light and medium-duty applications, the system may contain a lean $NO_x$ trap (LNT) which serves to store and reduce $NO_x$, as well as remove carbon monoxide and unburned hydrocarbons from the exhaust stream.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion to occur. This is particularly true for the downstream catalyst components, such as an SCR catalyst, which can take several minutes to reach a suitable operating temperature.

An SCR catalyst positioned downstream from a DOC catalyst can be fairly sensitive to the $NO_2/NOx$ ratio of the exhaust gas leaving the DOC catalyst. Accordingly, there is a continuing need in the art to provide a DOC catalyst article that is capable of producing a relatively constant $NO_2/NOx$ ratio in exhaust gas leaving a DOC catalyst over a range of inlet temperatures.

SUMMARY OF THE INVENTION

The present disclosure is directed toward a catalytic article that can be used to treat exhaust gas, wherein the catalytic article includes at least 2 oxidation regions. A first oxidation region is designed to provide high oxidation activity, and a second oxidation region is designed to provide reduced oxidation activity, as compared to the first oxidation region. It was found, as described in more detail below, that the combination of at least two oxidation regions in catalytic articles provides for a more uniform $NO_2/NOx$ ratio in exhaust gas leaving the catalytic article over a wide temperature range. As described herein, the arrangement of the first catalyst composition and the second catalyst composition provides a PGM radial zoning profile in the catalyst article.

In various embodiments, a catalyst article is provided, comprising a substrate comprising an inlet side, an outlet side, and a plurality of passageways extending from the inlet side to the outlet side such that an exhaust gas can enter the inlet side of the substrate and exit the outlet side of the substrate, wherein the catalyst article comprises a first oxidation region comprising a first subset of said plurality of passageways and a second oxidation region comprising a second subset of said plurality of passageways. The ratio of the number of passageways of the first oxidation region to the number of passageways of the second oxidation region are in the range of about 10:90 to about 90:10.

A first catalyst composition is coating at least a portion of each passageway of the first oxidation region, the first catalyst composition comprising at least one platinum group metal (PGM) component and a first support material on which the at least one PGM component is supported. For example, the first catalyst composition is positioned as a sole PGM-containing catalyst layer, or a zoned portion thereof, or as a top PGM-containing catalyst layer, or a zoned portion thereof, in the first oxidation region such that exhaust gas flowing into the inlet side of the substrate in the first oxidation region comes in contact with the first catalyst composition. A second catalyst composition is coating at least a portion of each passageway of the second oxidation region, the second catalyst composition comprising at least one platinum group metal (PGM) component and a support material on which the at least one PGM component is supported. For example, the second catalyst composition is positioned as a sole PGM-containing catalyst layer, or a zoned portion thereof, or as a top PGM-containing catalyst layer, or a zoned portion thereof, in the second oxidation region such that exhaust gas flowing into the inlet side of the substrate in the second oxidation region comes in contact with the second catalyst composition. The first catalyst composition comprises platinum and the weight ratio of Pt:Pd in the first catalyst composition is greater than the weight ratio of Pt:Pd in the second catalyst composition.

In some embodiments, the weight ratio of Pt:Pd in the first catalyst composition is about 1:0 to about 1:1. The first catalyst composition can comprise, for example, a total PGM loading from about 0.5 to about 200 $g/ft^3$. In some embodiments, the weight ratio of Pt:Pd in the second catalyst composition is about 0:1 to about 1:1. The second catalyst composition can comprise, for example, a total PGM loading from about 0.5 to about 200 g/ft$^3$.

In various embodiments, the support material of one or both of the first catalyst composition and the second catalyst composition comprises a refractory metal oxide. For example, the refractory metal oxide can be selected from the group consisting of alumina, titania, zirconia, mixtures of alumina with one or more of titania, zirconia and ceria, ceria coated on alumina, titania coated on alumina, silica-alumina, aluminosilicates, alumina-zirconia, alumina-chromia, alumina-ceria, and combinations thereof. In some embodiments, one or both of the first catalyst composition and the second catalyst composition comprises a rare earth metal oxide selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), yttrium (Y), and combinations thereof.

In some embodiments, one or both of the first catalyst composition and the second catalyst composition comprises a hydrocarbon storage material, such as a zeolite. For example, the zeolite can be selected form the group consisting of faujasite, chabazite, clinoptilolite, mordenite, silicalite, zeolite X, zeolite Y, ultrastable zeolite Y, ZSM-5 zeolite, offretite, or a beta zeolite.

The substrate can be a monolithic flow-through substrate having a plurality of parallel passageways open to fluid flow, for example. The substrate can be, for example, a wall-flow substrate such that the plurality of passageways include a porous wall portion. In some embodiments, the substrate comprises a ceramic material selected from the group consisting of cordierite, mullite, cordierite-α alumina, silicon carbide, silicon nitride, zircon mullite, spodumene, alumina-silica magnesia, zircon silicate, sillimanite, magnesium silicates, zircon, petalite, α alumina, aluminosilicate, or any combination thereof. In various embodiments, the substrate comprises a metallic material.

In various embodiments, one of the first and second oxidation regions is a centrally located region and the other of the first and second oxidation regions is an annular region, when the substrate is viewed from the inlet end. In some embodiments, one of the first and second oxidation regions is a pie wedge region and the other of the first and second oxidation regions is the remaining region of the substrate when the substrate is viewed form the inlet end.

In certain embodiments, the first catalyst composition and the second catalyst composition are in a layered configuration in one or both of the first oxidation region and the second oxidation region. For example, the first catalyst composition can be layered on top of the second catalyst composition in the first oxidation region. In some embodiments, the second catalyst composition can be layered on top of the first catalyst composition in the second oxidation region. In various embodiments, the second catalyst composition is coated on the substrate in both the first oxidation region and the second oxidation region, and the first catalyst composition is only coated on the substrate in the first oxidation region. In various embodiments, at least one of the first catalyst composition and the second catalyst composition are laterally zone-coated with a third catalyst composition in the respective oxidation region.

An exhaust gas treatment system for an internal combustion engine is also provided herein, wherein the exhaust gas treatment system includes a catalytic article as described herein, wherein the catalytic article is downstream of and in fluid communication with the internal combustion engine. The exhaust gas treatment system can further include one or more catalytic articles selected from the group consisting of a selective catalytic reduction (SCR) catalyst, a soot filter, an ammonia oxidation (AMO$_x$) catalyst, and a lean-NO$_x$ trap (LNT).

A method for treating an exhaust gas stream comprising hydrocarbons, particulate matter carbon monoxide, and NO$_x$ is also provided herein, the method including passing the exhaust gas stream through a catalytic article according to the present disclosure. In various embodiments, a method for treating an exhaust gas stream whereby the PGM zoning strategy provides for flat distribution of NO oxidation to NO$_2$ across a wide temperature region is provided herein.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1A:
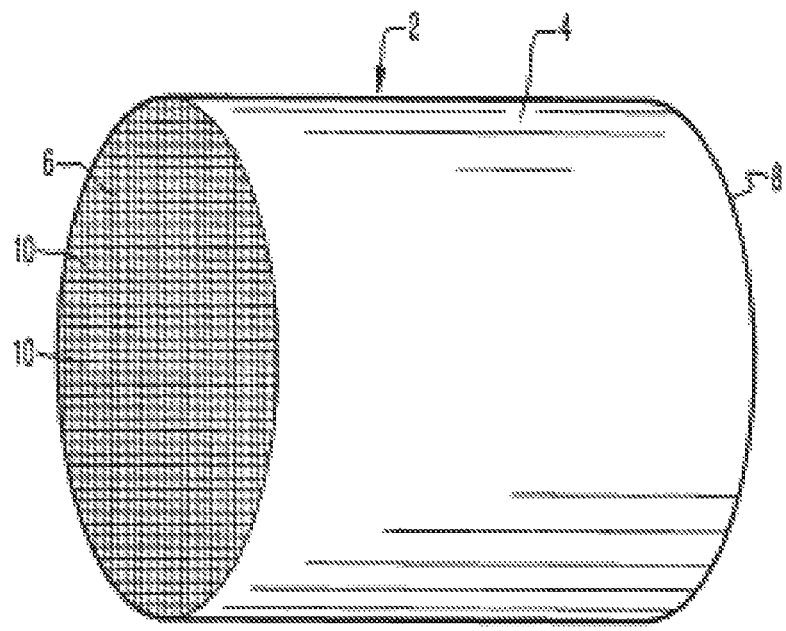
FIG. 1A is a perspective view of a honeycomb-type substrate which may be a substrate in accordance with the present disclosure.

The present invention now will be described more fully hereinafter. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents. It is to be understood that the invention is not limited to the details of construction or process steps set forth in the following description. The invention is capable of other embodiments and of being practiced or being carried out in various ways. Like numbers refer to like elements throughout. As used in this specification and the claims, the singular forms "a," "an," and "the" include plural referents unless the context clearly dictates otherwise.

The invention provides a catalytic article comprising a substrate which includes at least two oxidation regions, when the substrate is viewed from the gas inlet end. For the purposes of the present disclosure, two oxidation regions are discussed in the embodiments described below, however, the present invention is not limited to a catalytic article with only two oxidation regions (e.g., there can be three or more oxidation regions, 4 or more oxidation regions, etc.). It was surprisingly found that the combination of at least two oxidation regions in a DOC catalytic article, wherein each oxidation region is characterized by a different level of oxidation activity, provides for a more uniform $NO_2/NO_x$ ratio in exhaust gas leaving the catalytic article over a wide temperature range. This can be advantageous in an engine exhaust system, particularly if an SCR catalyst, which can be fairly sensitive to the $NO_2/NO_x$ ratio of the exhaust gas, is positioned downstream from the DOC catalytic article.

A first oxidation region includes a first catalyst composition which provides relatively high oxidation activity. A second oxidation region includes a second catalyst composition which provides lower oxidation activity, as compared to the first catalyst composition. Each of the first and second oxidation catalyst compositions comprise at least one platinum group metal (PGM) component. As is known in the art, platinum provides high NO oxidation activity. As such, the first oxidation catalyst, the high oxidation activity catalyst, includes a higher weight percentage of platinum than the second oxidation catalyst, based on the total weight of the catalyst composition.

The first catalyst composition can be positioned in the first oxidation region as a sole PGM-containing catalyst layer in the first oxidation region, or a zoned portion thereof, or the first oxidation catalyst composition can be positioned as a top PGM-containing layer in the first oxidation region, or a zoned portion thereof. As used herein, a top layer refers to a layer coated on top of at least one additional coating layer which has already been coated on the substrate of a catalytic article. As such, the top layer is further away from the substrate than a bottom layer which the top layer is coated on. Different embodiments of catalytic articles according to the present disclosure are discussed in more detail below. The first catalyst composition is positioned such that exhaust gas flowing into the inlet side of the substrate in the first oxidation region comes in contact with the first catalyst composition. It is noted that the substrate can be a traditional honeycomb flow-through substrate or a wall-flow filter, for example. Different embodiments of substrates useful in the catalytic articles provided herein are described in more detail below.

The second catalyst composition can be positioned in the second oxidation region as a sole PGM-containing catalyst layer in the second oxidation region, or a zoned portion thereof, or the second catalyst composition can be positioned as a top PGM-containing catalyst layer in the second oxidation region, or a zoned portion thereof. The second catalyst composition is positioned such that such that exhaust gas flowing into the inlet side of the substrate in the second oxidation region comes in contact with the second catalyst composition.

Catalytic Articles

Substrate

In one or more embodiments, the present catalyst compositions are disposed on a substrate to form a catalytic article. Catalytic articles comprising the substrates are part of an exhaust gas treatment system (e.g., catalyst articles including, but not limited to, articles including the DOC compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 1B:
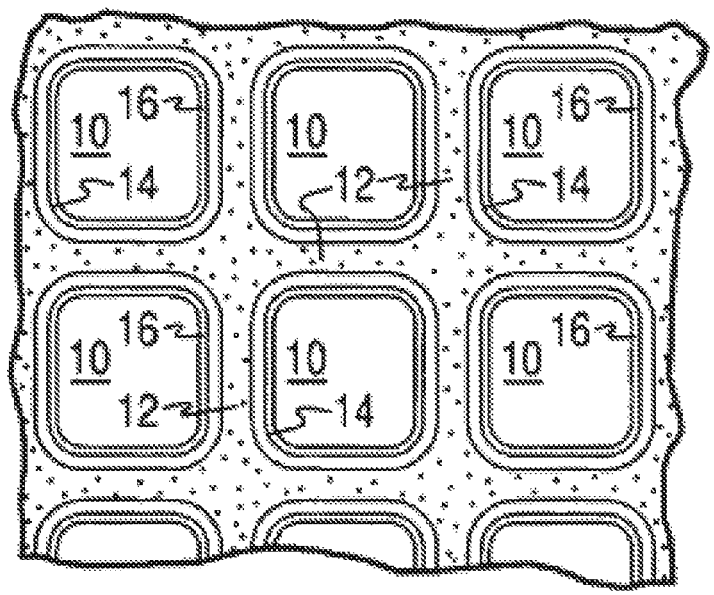
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

A catalytic article can be provided by applying a catalytic coating (e.g., as disclosed herein) to the substrate as a washcoat. FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., two, three, or four or more) catalyst composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

Figure 2:
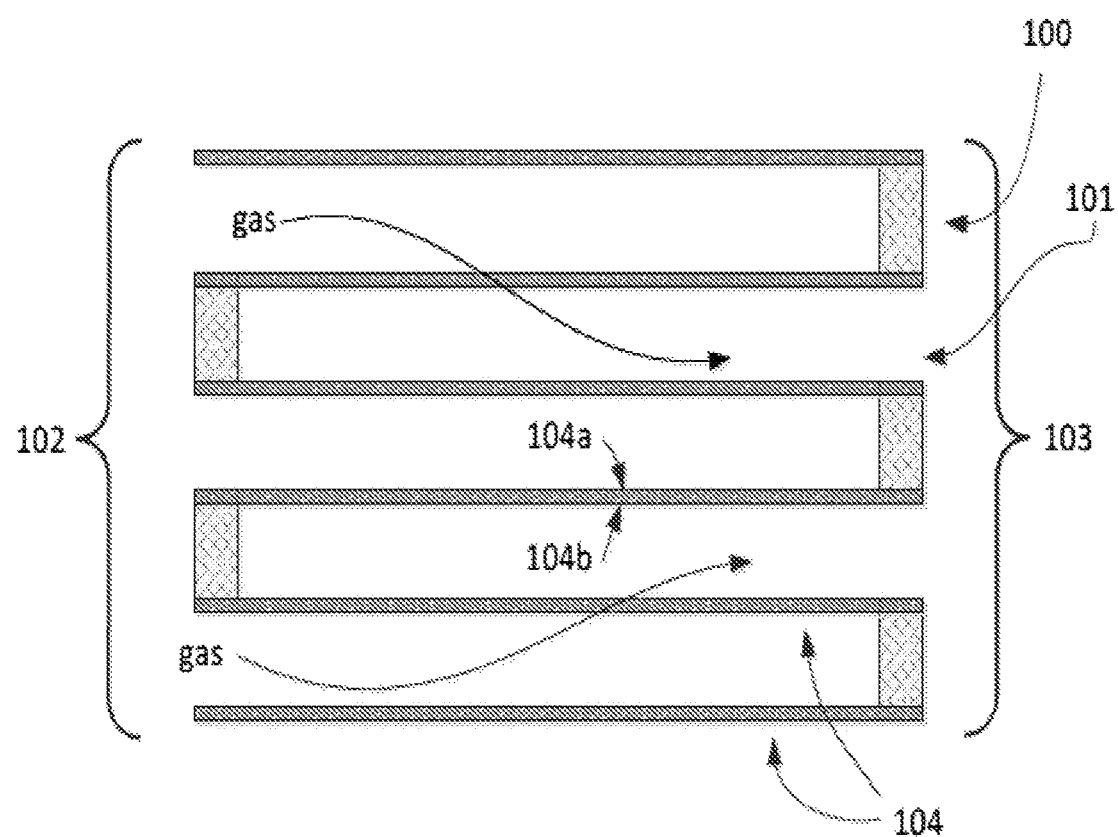
FIG. 2 is a cutaway view of a section enlarged relative to FIG. 1A, wherein the honeycomb-type substrate in FIG. 1A represents a wall-flow filter.

FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

Wall-flow filter substrates typically have a wall thickness from about 50 microns to about 2000 microns, for example from about 50 microns to about 450 microns or from about 150 microns to about 400 microns. The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of >50%, >60%, >65% or >70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Substrate Coating

To produce catalytic articles, a substrate as disclosed herein is coated with a catalytic composition. The coatings are "catalytic coating compositions" or "catalytic coatings." The terms "catalyst composition" and "catalytic coating composition" are synonymous.

The catalytic coating may comprise one or more thin, adherent coating layers disposed on and in adherence to least a portion of a substrate. In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, e.g., a first catalyst composition and a second catalyst composition, as described in more detail below.

A catalyst composition may typically be applied in the form of a washcoat, containing support material having catalytically active species thereon. The catalyst composition can be mixed with water (if in dried form) to form a slurry for purposes of coating a catalyst substrate. In addition to the catalyst particles, the slurry may optionally contain alumina as a binder, associative thickeners, and/or surfactants (including anionic, cationic, non-ionic or amphoteric surfactants). In some embodiments, the pH of the slurry can be adjusted, e.g., to an acidic pH of about 3 to about 5.

When present, an alumina binder is typically used in an amount of about 0.02 $g/in^3$ to about 0.5 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 30-40 wt %. In one embodiment, the post-milling slurry is characterized by a D90 particle size of about 10 to about 50 microns (e.g., about 10 to about 20 microns). The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a material applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

In one embodiment, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers. A catalyst layer resulting from repeated washcoating of the same catalyst material to build up the loading level is typically viewed as a single layer of catalyst. In another embodiment, the catalyst composition is applied in multiple layers with each layer having a different composition. Additionally, the catalyst composition can be zone-coated, meaning a single substrate can be coated with different catalyst compositions in different areas along the gas effluent flow path, as described below.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

In describing the quantity of washcoat or catalytic metal components or other components of the composition, it is convenient to use units of weight of component per unit volume of catalyst substrate. Therefore, the units, grams per cubic inch ("$g/in^3$") and grams per cubic foot ("$g/ft^3$"), are used herein to mean the weight of a component per volume of the substrate, including the volume of void spaces of the substrate. Other units of weight per volume such as g/L are also sometimes used. The total loading of the catalyst composition (including catalytic metal and support material)

on the catalyst substrate, such as a monolithic flow-through substrate, is typically from about 0.5 to about 6 Win', and more typically from about 1 to about 5 Win'. Total loading of the PGM or base metal component without support material is typically in the range of about 0.5 to about 200 g/ft$^3$ (e.g., 10 to about 100 g/ft$^3$). It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Radially-Zoned Oxidation Regions

As used herein, the phrase "radially-zoned oxidation regions" refers to applying different catalyst compositions to at least two different regions of a substrate of a catalytic article, when viewing the substrate from a gas inlet side, such that the two or more oxidation regions each provide a different level of oxidation activity. As described above, a substrate can include an inlet side and an outlet side, and a plurality of passageways extending from the inlet side to the outlet side. The first region comprises a first subset of said plurality of passageways. The second region comprises a second subset of said plurality of passageways. Again, it is noted that embodiments of the present disclosure are not limited to two regions. For example, a substrate according to the present disclosure can include 3, 4, or more regions, each region comprising a subset of the plurality of passageways of the substrate. However, for the ease of discussion, only two regions are referred to in the figures and description below.

Figure 3A:
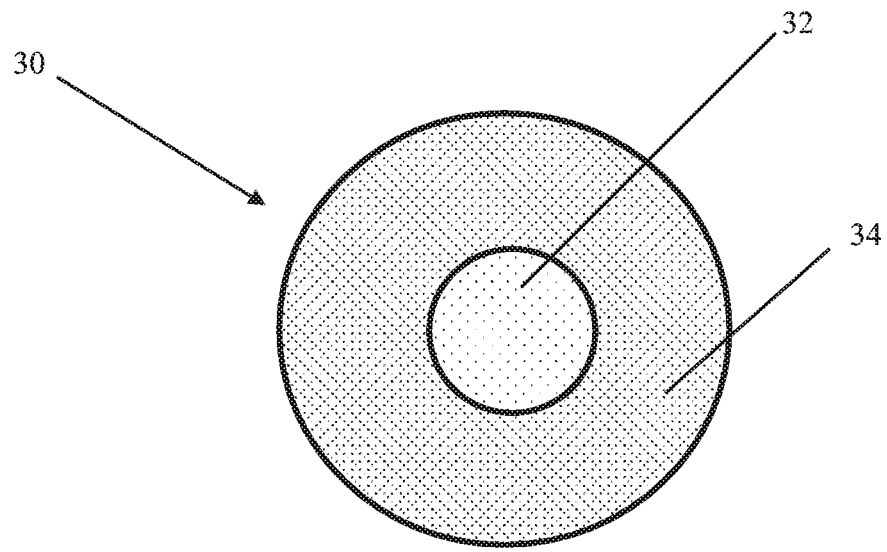
FIGS. 3A and 3B show a schematic cross-sectional view of an inlet end of an exemplary substrate.

For example, FIG. 3A shows a schematic cross-sectional view of an inlet end of an exemplary substrate 30. As illustrated in FIG. 3A, the substrate can include a first region 32 and a second region 34. At least a portion of each passageway in the first oxidation region 32 is coated with a first oxidation catalyst. At least a portion of each passageway in the second oxidation region 34 is coated with a second oxidation catalyst. The first region 32 provides a high level of oxidation activity as compared to the second region 34. In other words, the catalyst composition(s) coated in the first oxidation region contain components that are particularly useful in treating the exhaust of diesel engines to convert hydrocarbon and carbon monoxide by catalyzing the oxidation of these pollutants to carbon dioxide and water. For example, as described in more detail below, the first oxidation catalyst composition includes a relatively high amount of platinum, which is a PGM known in the art to provide high oxidation activity in PGM catalyst compositions.

Figure 3B:
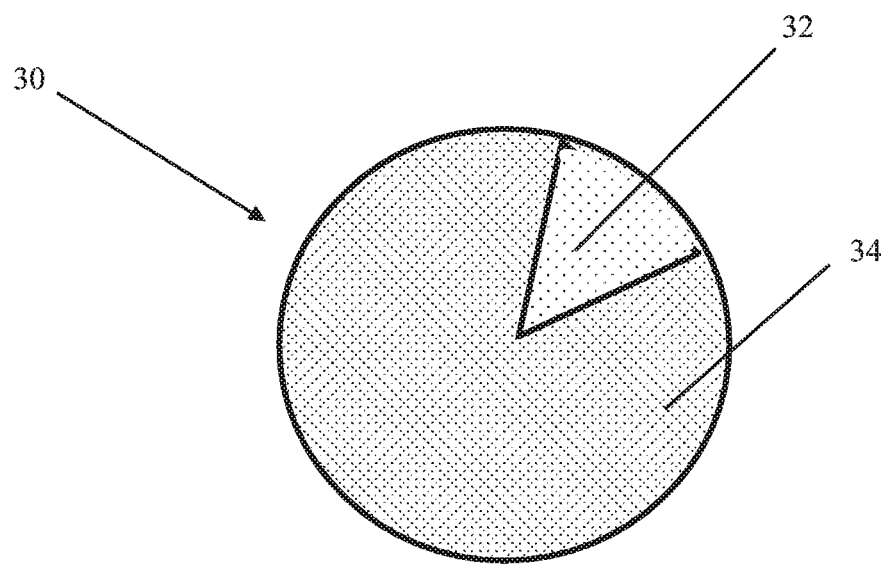

Each of the oxidation regions can be of any shape or size, and are not limited to circular shapes or a first concentric center region and outer annular second region as illustrated in FIG. 3A. As illustrated in FIG. 3B for example, the first region 32 can be a pie wedge shape. The shape or configuration that the subset of passageways defining a region takes is not meant to be limiting. For example, a region can be configured as a chord, semi-circular, and other shapes known in the art. The level of oxidation activity of a given region and the number of passageways within a first region as compared to a second region are factors that affect the overall oxidation activity of the catalytic article.

In various embodiments, the first region can comprise about 10-70, or about 30-60, or about 25-40 percent of the plurality of passageways in the substrate. In some embodiments, the second region can comprise about 30-90, or about 40-70, or about 60-75 percent of the plurality of passageways in the substrate. The ratio of the number of passageways of the first substrate region to the number of passageways of the second region can be in the range of about 10:90 to about 90:10, or about 20:80 to about 80:20, or about 30:70 to about 70:30. In various embodiments, the ratio of the surface area of the substrate coated by the catalyst composition(s) in the first region to the surface area of the substrate coated by the catalyst composition(s) in the second region, can be in the range of about 10:90 to about 90:10, or about 20:80 to about 80:20. The proportion of the substrate defined by each of the different oxidation regions can affect the $NO_2/NO_x$ ratio of the gases leaving the catalytic article, as described in Example 1 below.

At least a portion of each passageway of the subset of passageways defining each region can be coated with a catalyst composition. Different catalyst compositions can be used to coat each region of the substrate. In some embodiments, the same catalyst composition can be applied as a catalyst coating layer to more than one region of the substrate. The entire axial length of each passageway, i.e., from the inlet end to the outlet end of the substrate, can be coated with a catalyst composition. In some embodiments, only a portion of the axial length of each passageway can be coated with a catalyst composition. In certain embodiments, the axial length of each passageway can be laterally zone-coated with two or more catalyst compositions. In some embodiments, one or more regions can be free of a catalyst coating and/or free of a PGM-based catalyst coating.

Figure 4:
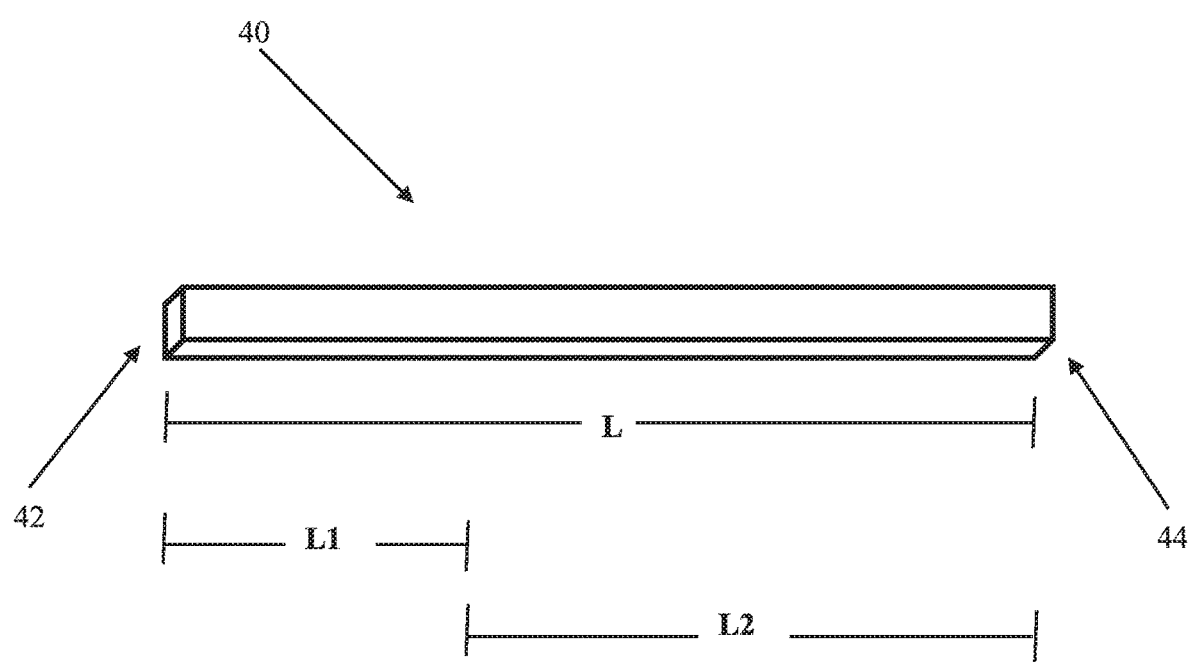
FIG. 4 shows a schematic front view of a single passageway within a substrate of catalytic articles described herein.

For example, FIG. 4 shows a schematic front view of a single passageway 40 having a gas inlet end 42 and a gas outlet end 44. The passageway 40 has a length L. A catalyst composition can be coated along the entire length L of each passageway 40 in a specified region. In an oxidation region having a laterally zoned configuration, a catalyst composition may only be coated along a partial length of each passageway such as length L1. In such an embodiment, the other portion of passageway 40, length L2, can be free of a catalyst composition, or coated with a different catalyst composition. Alternatively, a catalyst composition can be coated along the entire length L of each passageway 40 in a specified region, and a different catalyst composition can be coated along a partial length (e.g., L1 or L2) of each passageway. Any number of zones can be used in a laterally-zoned coating configuration. Furthermore, each passageway or each portion of each passageway can be coated with one or more layers of a single catalyst composition, and/or one or more layers of different catalyst compositions.

According to embodiments of the present disclosure, a first catalyst composition coats at least a portion of each passageway of a first region of the substrate. The first catalyst composition is a high oxidation catalyst composition, meaning that exhaust gas contacting the first catalyst compositions undergoes a high level of oxidation of the hydrocarbon and carbon monoxide present in the inlet gas stream. The first catalyst composition can be positioned as a sole PGM-containing catalyst layer in each of the passageways in the first subset defining the first oxidation region, or a zoned portion thereof. The first catalyst composition can be positioned as a top, bottom, or middle PGM-containing catalyst layer in each of the passageways in the first subset defining the first oxidation region, or a zoned portion thereof. The first catalyst composition is positioned such that exhaust gas flowing into the inlet side of the substrate in the first oxidation region comes in contact with the first catalyst composition.

Figure 5A:
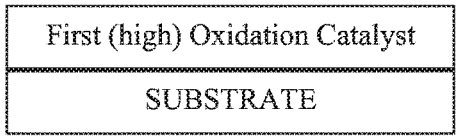
FIGS. 5A-5H show exemplary box diagrams of catalyst positioning in each of the passageways in the first subset of passageways defining the first oxidation region.
Figure 5B:
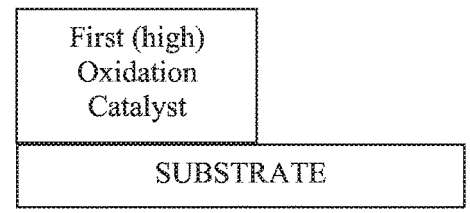
Figure 5C:
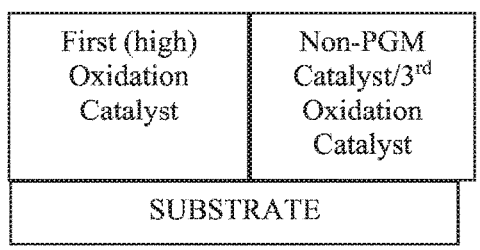
Figure 5D:
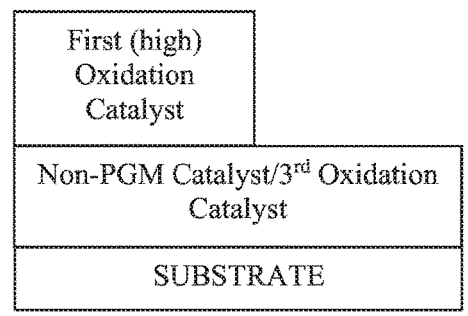
Figure 5E:
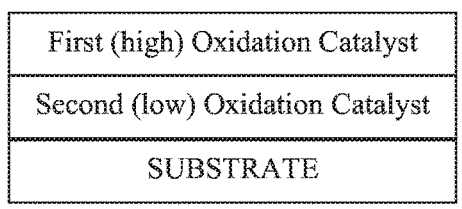
Figure 5F:
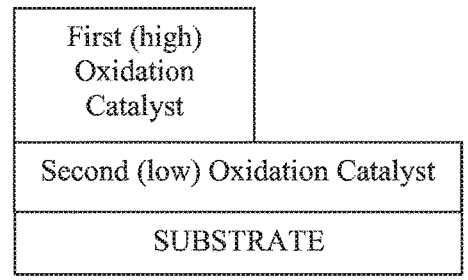
Figure 5G:
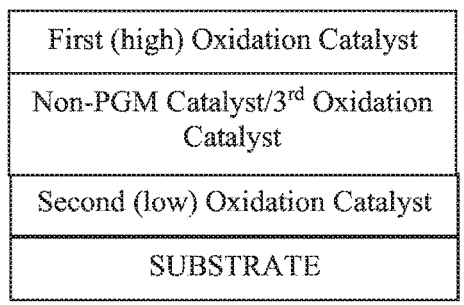
Figure 5H:
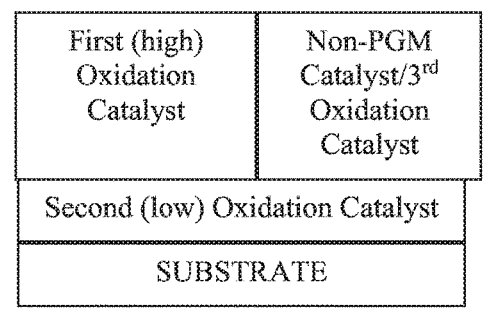

FIGS. 5A-5H show exemplary box diagrams of catalyst positioning in each of the passageways in the first subset defining the first oxidation region (i.e., high oxidation region). As shown in FIG. 5A, the first oxidation catalyst composition can be the only catalyst composition coated on the entire length of passageways of the first oxidation region, or, as shown in FIG. 5B, along a partial length of the passageways. As illustrated in FIGS. 5C and 5D, for example, the first catalyst composition can be laterally zone-coated with a third catalyst composition. The third catalyst composition can be a catalyst composition that does not include a PGM component, and/or a third oxidation catalyst composition which is different from the first and second catalyst compositions described herein. As illustrated in FIGS. 5E and 5F, for example, the first catalyst composition and the second catalyst composition can be in a layered configuration in the first oxidation region. In such an embodiment, the first catalyst composition is layered on top of the second catalyst composition in the first oxidation region. The first oxidation catalyst is positioned as a top layer of the entire length of each passageway, or as the top layer of a zone of each passageway. It is noted that in some embodiments, the first catalyst composition can be layered below the second catalyst composition (i.e., the first catalyst composition is layered between the substrate and the second (and/or third) catalyst composition for at least a portion of each passageway). As illustrated in FIGS. 5G and 511, for example, each of the passageways of the first oxidation region can include the first oxidation catalyst, the second oxidation catalyst, and a third catalyst composition in layered and/or laterally zoned configurations. Alternative arrangements of various catalyst compositions and/or additional catalyst compositions not pictured in the figures are considered herein.

A second catalyst composition coats at least a portion of each passageway of a second region of the substrate. The second catalyst composition is a low oxidation catalyst composition, as compared to the first oxidation catalyst composition in terms of oxidation activity. The second catalyst composition can be positioned in the second oxidation region as a sole PGM-containing catalyst layer in the second oxidation region, or a zoned portion thereof, or the second catalyst composition can be positioned as a top, bottom, or middle PGM-containing catalyst layer in the second oxidation region, or a zoned portion thereof. The second catalyst composition is positioned such that such that exhaust gas flowing into the inlet side of the substrate in the second oxidation region comes in contact with the second catalyst composition.

Figure 6A:
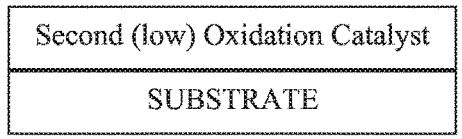
FIGS. 6A-6H show exemplary box diagrams of catalyst positioning in each of the passageways in the second subset of passageways defining the second oxidation region.
Figure 6B:
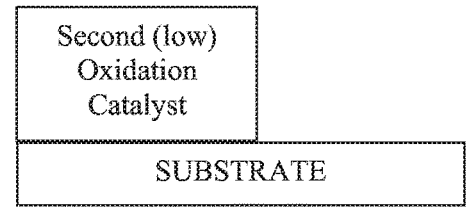
Figure 6C:
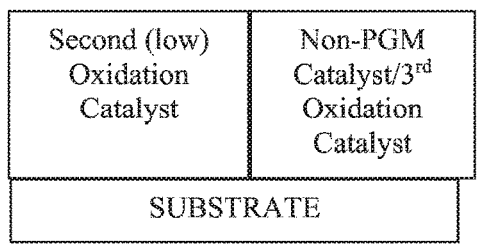
Figure 6D:
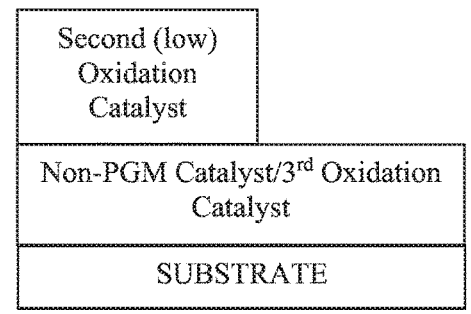
Figure 6E:
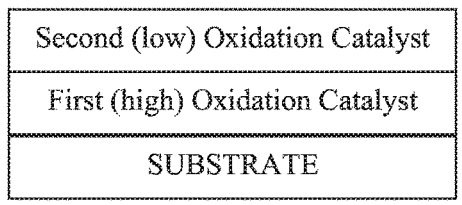
Figure 6F:
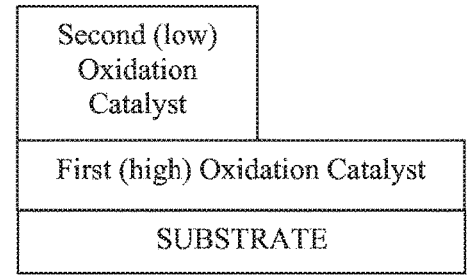
Figure 6G:
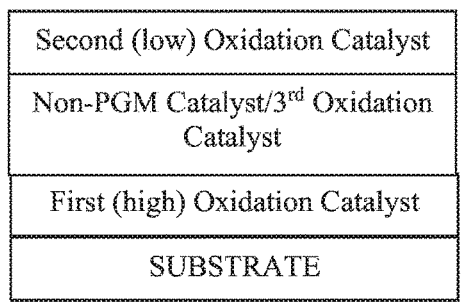
Figure 6H:
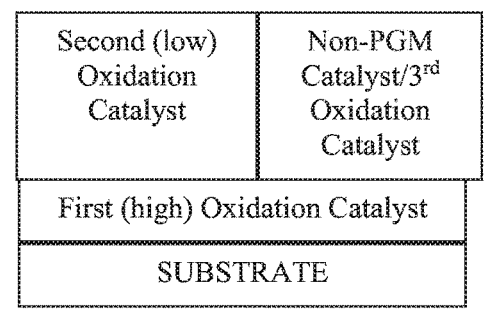

FIGS. 6A-6H show exemplary box diagrams of catalyst positioning in each of the passageways in the second subset of passageways defining the second oxidation region (i.e., low oxidation region). As shown in FIG. 6A, the second oxidation catalyst composition can be the only catalyst composition coated on the entire length of passageways of the second oxidation region, or, as shown in FIG. 6B, along a partial length of the passageways. As illustrated in FIGS. 6C and 6D, for example, the second catalyst composition can be laterally zone-coated with a third catalyst composition in the second oxidation region. As described above, the third catalyst composition can be a catalyst composition that does not include a PGM component, and/or a third oxidation catalyst composition which is different from the first and second catalyst compositions described herein. As illustrated in FIGS. 6E and 6F, for example, the second catalyst composition and the first catalyst composition can be in a layered configuration in the second oxidation region. The second catalyst composition can be layered on top of the first catalyst composition in the second oxidation region. It is noted that in some embodiments, the second catalyst composition can be layered below the first catalyst composition (i.e., the second catalyst composition is layered between the substrate and the first (and/or third) catalyst composition for at least a portion of each passageway). As illustrated in FIGS. 6G and 6H, for example, each of the passageways of the second oxidation region can include the first oxidation catalyst, the second oxidation catalyst, and a third catalyst composition in layered and/or laterally zoned configurations. Alternative arrangements of various catalyst compositions and/or additional catalyst compositions not pictured in the figures are considered herein.

In various embodiments of the present invention, the total weight ratio of Pt:Pd in the first oxidation region (i.e., high oxidation region) can be about 1:0 to about 0:1, or about 1:0 to about 1:400. The total amount of PGM in the first oxidation region can be about 0.5 to about 200 g/ft$^3$, about 5-150 g/ft$^3$, or about 10-100 g/ft$^3$. The total weight ratio of Pt:Pd in the second oxidation region (i.e., low oxidation region) can be about 0:1 to about 1:0, or about 0:1 to about 4:1. The total amount of PGM in the second oxidation region can be about 0.5 to about 200 g/ft$^3$, about 5-150 g/ft$^3$, or about 10-100 g/ft$^3$. The total weight ratio and total amounts are based on the total dry weights of the PGM in each region regardless of whether a sole catalyst composition or multiple catalyst compositions are applied to the passageways of each region.

In order to produce a radially-zoned catalytic article as described herein, it is necessary to mask the region(s) that are not being coated with a particular catalyst composition, thereby only leaving the passageways in the region to be coated open and ready to receive a catalyst coating layer. Any material or apparatus known in the art to be useful for blocking or plugging a passageway can be used to mask the passageways of the region(s) not intended to receive a particular catalyst coating. For example, masking materials can include, but are not limited to, duct tape, paraffin wax, hot melt glue, etc. The type of masking/blocking material or apparatus used is not intended to be limiting.

In certain preferred embodiments, the second catalyst composition is coated on the substrate in both the first oxidation region and the second oxidation region, and the first catalyst composition is only coated on the substrate in the first oxidation region (e.g., FIG. 5E for the first oxidation region, and FIG. 6A for the second oxidation region). As such, the entire catalyst substrate can be first coated with the second catalyst composition according to conventional catalyst washcoat coating methods (e.g., dipping, drying, and calcining the substrate as described above). The passageways of second oxidation region (i.e., the region having low oxidation activity and intended to only be coated with the second oxidation catalyst) can then be masked with a masking material. The partially masked substrate can then be coated with the first catalyst composition according to conventional catalyst washcoat coating methods. Since the passageways of the second oxidation region have been masked, when the substrate is dipped into the first oxidation catalyst slurry, only the passageways of the first oxidation region (i.e., the unmasked passageways) will receive a layer of the first oxidation catalyst.

In various embodiments, the passageways of the first oxidation region can be masked when the second oxidation catalyst is applied to the second oxidation region. As such, only one or more washcoat coatings of the first oxidation catalyst can be applied to the passageways of the first oxidation region, and only one or more coatings of the second oxidation catalyst can be applied to the passageways of the second oxidation region. As discussed above, many different configurations are considered, including the inclusion of one or more additional catalyst compositions and/or lateral zone coatings in one or more regions of the substrate.

Catalyst Compositions

A catalyst and/or sorbent composition as described herein may comprise one or more supports or "carriers" such as refractory inorganic solid oxide porous powders further comprising functionally active species.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively the binder can be zirconia-based or silica-based, for example zirconium acetate, zirconia sol or silica sol. When present, the alumina binder is typically used in an amount of about 0.05 g/in$^3$ to about 1 g/in$^3$.

In various embodiments, the catalytic articles described herein include a first oxidation catalyst composition and a second oxidation catalyst composition. Generally, a diesel oxidation catalyst (DOC) composition comprises one or more platinum group metal (PGM) components dispersed on a support, such as a refractory metal support. Various such DOC compositions are known for use in treating the exhaust of diesel engines in order to convert both hydrocarbon (HC) and carbon monoxide (CO) gaseous pollutants by catalyzing the oxidation of these pollutants to carbon dioxide and water.

The present DOC compositions (also referred to herein as "oxidation catalyst compositions") comprise a catalytically active PGM component and a metal selected from the group consisting of alkali and alkaline earth metals. PGM components useful in the disclosed DOC compositions include any component that includes a PGM, such as platinum, palladium, ruthenium, rhodium, osmium, iridium, and/or gold (Pt, Pd, Ru, Rh, Os, Ir, and/or Au). For example, the PGM may be in metallic form, with zero valence, or the PGM may be in an oxide form. The PGM components can include the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component is a metal or an oxide thereof (e.g., including, but not limited to, platinum or an oxide thereof).

The PGM component of the disclosed oxidation catalyst compositions is typically present in an amount from about 0.1 wt % (weight percent), about 0.5 wt %, about 1.0 wt %, about 1.5 wt % or about 2.0 wt % to about 3 wt %, about 5 wt %, about 7 wt %, about 9 wt %, about 10 wt %, about 12 wt %, about 15 wt %, about 16 wt %, about 17 wt %, about 18 wt %, about 19 wt % or about 20 wt %, based on the weight of the composition.

The metal component of the disclosed oxidation catalyst compositions comprises a metal component selected from the group consisting of alkali metals and alkaline earth metals. In some embodiments, the alkali metal may be selected from one or more of lithium, sodium, potassium, rubidium or cesium. In some embodiments, the alkaline earth metal may be selected from one or more of magnesium, calcium, strontium, or barium. In some embodiments, the alkali metal comprises lithium, sodium, potassium, rubidium, cesium, or combinations thereof. In some embodiments, the alkali metal is sodium. In some embodiments, the alkali metal is lithium. In some embodiments, the alkali metal is potassium. In some embodiments, the alkali metal is rubidium. In some embodiments, the alkali metal is cesium. In some embodiments, the alkali metal is a combination of sodium and at least one of lithium, potassium, rubidium, or cesium.

In some embodiments, the alkaline earth metal comprises magnesium, calcium, strontium, barium, or combinations thereof. In some embodiments, the alkaline earth metal is magnesium. In some embodiments, the alkaline earth metal is calcium. In some embodiments, the alkaline earth metal is strontium. In some embodiments, the alkaline earth metal is barium.

The alkali metal or alkaline earth metal of the disclosed oxidation catalyst composition is typically present in an amount of from about 0.1 wt %, about 0.3 wt %, about 0.5 wt % or about 1.0 wt % to about 1.5 wt %, about 2.0 wt %, about 2.5 wt %, about 3.0 wt %, about 3.5 wt % or about 4.0 wt %, based on the weight of the composition.

The disclosed oxidation catalyst compositions may optionally further comprise one or more additional catalytically active metals selected from the group consisting of copper, iron, chromium, manganese, cobalt, and nickel. In some embodiments, the additional catalytically active metal is manganese.

Typically the PGM component of the disclosed oxidation catalyst composition is supported on a support material. The PGM component can be, for example, supported on a refractory metal oxide and/or on a molecular sieve.

In some embodiments, the support material on which the catalytically active PGM component is deposited comprises a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

High surface area refractory metal oxides that may be suitable for use to support the PGM component include alumina, titania, zirconia; mixtures of alumina with one or more of titania, zirconia and ceria; ceria coated on alumina or titania coated on alumina. The refractory metal oxide may contain an oxide or a mixed oxide such as silica-alumina, aluminosilicates which may be amorphous or crystalline, alumina-zirconia, alumina-chromia, alumina-ceria and the like. The refractory metal oxides are in particular gamma alumina, silica-alumina, ceria coated on alumina, titania coated on alumina or zirconia coated on alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia alumina and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 m²/g, often up to about 200 m²/g or higher. An exemplary refractory metal oxide comprises high surface area γ-alumina having a specific surface area of about 50 to about 300 m²/g. Such activated alumina is usually a mixture of the gamma and delta phases of alumina, but may also contain substantial amounts of eta, kappa and theta alumina phases. "BET surface area" has its usual meaning of referring to the Brunauer-Emmett-Teller method for determining surface area by $N_2$ adsorption measurements. Unless otherwise stated, "surface area" refers to BET surface area. Desirably, the active alumina has a specific surface area of about 60 to about 350 m²/g, for example from about 90 to about 250 m²/g. In certain embodiments, metal oxide supports useful in the catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$), or doped zirconia materials, such as Si-doped $ZrO_2$ (including, but not limited to 5-30% $SiO_2$—$ZrO_2$).

Advantageously, a refractory metal oxide may be doped with one or more additional basic metal oxide materials such as lanthanum, barium, praseodymium, neodymium, samarium, strontium, calcium, magnesium, niobium, hafnium, gadolinium, terbium, dysprosium, erbium, ytterbium, tin, or zinc. In some embodiments, the metal oxide dopant may be selected from lanthanum oxide, barium oxide, strontium oxide, calcium oxide, magnesium oxide or combinations thereof. The metal oxide dopant, where present, is typically present in an amount of about 1 to about 20% by weight, based on the weight of the catalyst composition. The dopant oxide materials, without wishing to be bound by theory, may serve to improve the high temperature stability of the refractory metal oxide support or function as a sorbent for acidic gases such as $NO_2$, $SO_2$ or $SO_3$.

The dopant metal oxides can be introduced using an incipient wetness impregnation technique or through usage of colloidal mixed oxide particles. Preferred dopant metal oxides include colloidal baria-alumina, baria-zirconia, baria-titania, zirconia-alumina, baria-zirconia-alumina, lanthana-zirconia and the like. Thus, the refractory metal oxides or refractory mixed metal oxides in the disclosed catalyst composition are most typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. These refractory metal oxides may be further doped with base metal oxides such as baria-alumina, baria-zirconia, baria-titania, zirconia-alumina, baria-zirconia-alumina, lanthana-zirconia and the like. Advantageously, the oxidation catalyst composition may comprise ceria, alumina and zirconia or doped compositions thereof.

The oxidation catalyst composition may comprise any of the above-named refractory metal oxides and in any amount. For example, refractory metal oxides in the oxidation catalyst composition may comprise at from about 15 wt %, about 20 wt %, about 25 wt %, about 30 wt % or about 35 wt % to about 50 wt %, about 55 wt %, about 60 wt % about 65 wt % or about 70 wt % based on the total dry weight of the catalyst composition. The oxidation catalyst composition may, for example, comprise from about 10 to about 99 wt % alumina, from about 15 to about 95 wt % alumina or from about 20 to about 85 wt % alumina.

The PGM component may be dispersed on the refractory metal oxide support by, for example, dispersing a soluble precursor (e.g., palladium nitrate) thereon. Alternatively, the PGM component is provided in particulate form in the composition, such as fine particles as small as 1 to 15 nanometers in diameter or smaller, as opposed to being dispersed on the support.

Optionally, the oxidation catalyst composition may contain one or more hydrocarbon (HC) storage component for the adsorption of hydrocarbons. Any known HC storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of at least about 25:1, preferably at least about 50:1, with useful ranges of from about 25:1 to 1000:1, 50:1 to 500:1, and about 25:1 to 300:1. Preferred zeolites include ZSM-5, Y, and beta zeolites. A particularly preferred adsorbent may comprise a beta zeolite of the type disclosed in U.S. Pat. No. 6,171,556, which is incorporated herein by reference in its entirety. When present, zeolites or other HC storage components are typically used in an amount of about 0.05 g/in³ to about 1 g/in³.

The catalytic articles described herein include a first oxidation catalyst composition coating at least a portion of each passageway of a first oxidation region of the substrate. The first oxidation catalyst composition is configured to provide relatively high oxidation activity. The first catalyst composition can comprise at least one platinum group metal (PGM) component and a first support material on which the at least one PGM component is supported. The first catalyst composition can comprise platinum. In some embodiments, the first catalyst composition can comprise platinum and palladium. The weight ratio of Pt:Pd in the first catalyst composition can about 1:0 to about 1:1, or about 4:1 to about 2:1. The total amount of PGM in the first oxidation catalyst composition can be about 0.5 to about 200 g/ft³, about 5-150 g/ft³, or about 10-100 g/ft³.

The catalytic articles described herein further include a second oxidation catalyst composition coating at least a portion of each passageway of a second oxidation region of the substrate. The second oxidation catalyst composition is configured to provide lower oxidation activity than the first catalyst composition, such that the second oxidation region of the substrate provides lower oxidation activity than the first oxidation region of the substrate. The second catalyst composition can comprise at least one platinum group metal (PGM) component and a second support material on which the at least one PGM component is supported. The second oxidation catalyst can comprise platinum and palladium. In certain embodiments, the second oxidation catalyst composition is substantially free of platinum. The weight ratio of Pt:Pd in the second catalyst composition can be about 0:1 to about 4:1, or about 0:1 to about 1:1, or about 0:1 to about 1:4. The total amount of PGM in the second oxidation catalyst composition can be about 0.5 to about 200 g/ft³, about 5-150 g/ft³, or about 10-60 g/ft³. In various embodiments, the amount of platinum in the first catalyst composition, measured in g/ft³, can be greater than the amount of platinum in the second catalyst composition. In some embodiments, the weight ratio of Pt:Pd in the first catalyst composition can be greater than the weight ratio of Pt:Pd in the second catalyst composition.

Method of Making Catalyst Composition

Preparation of a porous support with a PGM or base metal component typically comprises impregnating the porous support (e.g., a refractory oxide support material in particulate form such as particulate alumina) with a PGM or base metal solution. Multiple metal components (e.g., platinum and palladium) can be impregnated at the same time or separately, and can be impregnated on the same support particles or separate support particles using an incipient wetness technique. The support particles are typically dry enough to absorb substantially all of the solution to form a moist solid. Aqueous solutions of water soluble compounds or complexes of the metal component are typically utilized, such as palladium or platinum nitrate, tetraammine palladium or platinum nitrate, tetraammine palladium or platinum acetate, copper (II) nitrate, manganese (II) nitrate, and ceric ammonium nitrate. In certain embodiments, colloidal platinum can be used in embodiments of the catalyst compositions described herein. Following treatment of the support particles with the metal solution, the particles are dried, such as by heat treating the particles at elevated temperature (e.g., 100-150° C.) for a period of time (e.g., 1-3 hours), and then calcining to convert the metal components to a more catalytically active form. An exemplary calcination process involves heat treatment in air at a temperature of about 400-550° C. for 1-3 hours. The above process can be repeated as needed to reach the desired level of impregnation. The resulting material can be stored as a dry powder or in slurry form.

Emission Treatment System

The present disclosure also provides an emission treatment system that incorporates a catalytic article as described herein. Typically, integrated emissions treatment systems comprise one or more catalytic articles/components for the treatment of exhaust gas emissions, e.g., exhaust gas emissions from a diesel engine. For example, the emission treatment system may comprise one or more of a catalyzed soot filter (CSF), a selective catalytic reduction (SCR) catalyst, and a selective catalytic reduction/ammonia oxidation (SCR/AMOx) catalyst, in addition to the diesel oxidation (DOC) catalytic article described herein. Some emission treatment systems include a lean $NO_x$ trap (LNT), a CSF catalyst, a SCR catalyst and/or a SCR/AMOx catalyst. The CSF, loaded with either PGM containing catalysts for CO/HC conversion or NO oxidation or with SCR catalysts for the SCR reaction (SCRoF), is typically located downstream from the DOC or LNT catalyst, although the relative placement of the various components of the emission treatment system can be varied.

As described above, the radially-zoned DOC catalytic article includes at least two oxidation catalyst compositions which can be useful in combusting unburned gaseous and non-volatile hydrocarbons (i.e., the SOF) and carbon monoxide to form carbon dioxide and water. The SCR catalyst can be any catalyst conventionally used to abate $NO_x$ present in engine exhaust and typically comprises a mixed metal oxide composition (e.g., vanadia/titania) or a metal ion-exchanged molecular sieve composition (e.g., Cu and/or Fe-promoted molecular sieve). The catalyzed soot filter (CSF) is designed to trap and burn soot and is coated with a washcoat layer containing one or more catalysts for burning trapped soot and or oxidizing exhaust gas stream emissions (e.g., one or more precious group metal catalysts such as platinum, palladium, and/or rhodium). The SCR/AMOx catalyst refers to an ammonia oxidation catalyst used to remove any slipped ammonia from the exhaust gas treatment system combined with an SCR catalyst (e.g., an AMOx catalyst in a bottom coat with PGM layered with a top coat of a catalyst with SCR functionality). The emission treatment system can further include components such as a reductant injector for ammonia precursor, a hydrocarbon injector for diesel fuel, additional particulate filtration components, and/or $NO_x$ storage and/or trapping components. The preceding list of components is merely illustrative and should not be taken as limiting the scope of the disclosure.

Figure 7:
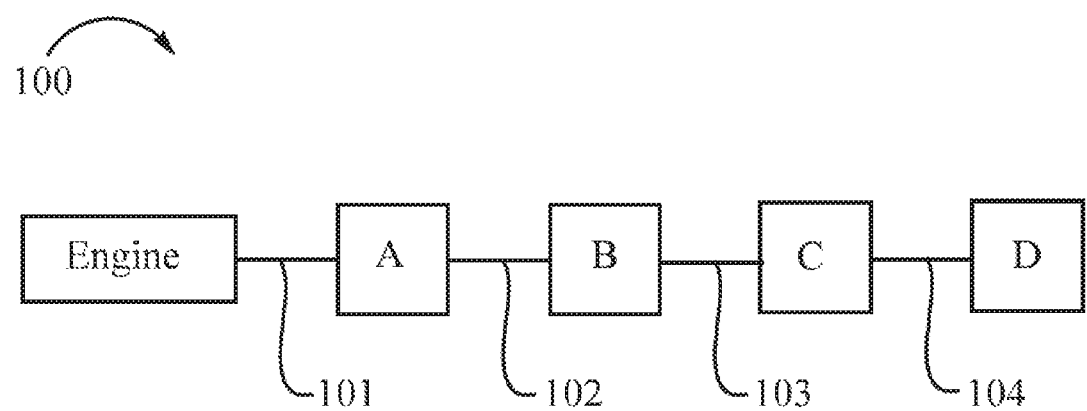
FIG. 7 shows a schematic depiction of various embodiments of an emission treatment system comprising a catalytic article as disclosed herein.

One exemplary emission treatment system is illustrated in FIG. 7, which is a schematic representation of an emission treatment system 100. As shown, an exhaust gas stream containing gaseous pollutants and particulate matter is conveyed via exhaust pipe 101 from an engine to a catalyst component A. Exhaust pipe 102 directs the treated exhaust gas stream exiting catalyst component A to catalyst component B. Next, exhaust pipe 103 directs the treated exhaust gas exiting catalyst component B to catalyst component C, which is located upstream of catalyst component D. Without limitation, Table 1 presents various exhaust gas configurations of one or more embodiments.

TABLE 1

| Catalyst Component A | Catalyst Component B | Catalyst Component C | Catalyst Component D |
|---|---|---|---|
| DOC* | SCR | CSF | — |
| SCR | DOC* | CSF | SCR/AMOx |
| DOC* | SCR | AMOx | — |
| DOC* | CSF | SCR | AMOx |
| DOC* | SCRoF | SCR/AMOx | — |
| DOC* | SCRoF | AMOx | — |
| DOC* | SCRoF | SCR | — |
| DOC* | CSF | SCR | SCR/AMOx |

*comprising a radially-zoned catalytic article according to the present disclosure

EXPERIMENTAL

Aspects of the present disclosure are more fully illustrated by the following examples, which are set forth to illustrate certain aspects of the present disclosure and are not to be construed as limiting thereof.

Example 1

A catalytic article according to the present disclosure was prepared having two oxidation catalyst compositions in a radially zoned configuration.

A first oxidation catalyst composition included both platinum and palladium in a Pt:Pd weight ratio of about 5:1. The total PGM loading of the platinum and palladium together in the first catalyst composition was about 40 g/ft³. The total platinum loading in the first catalyst composition was about 33.33 g/ft³. The total palladium loading in the first catalyst composition was about 6.67 g/ft³.

A second catalyst composition included both platinum and palladium in a Pt:Pd weight ratio of about 1:2. The total PGM loading of the platinum and palladium together in the second catalyst composition was about 45 g/ft³. The total platinum loading in the second catalyst composition was about 15 g/ft³. The total palladium loading in the second catalyst composition was about 30 g/ft³.

The first oxidation catalyst had a high Pt level as compared to the second oxidation catalyst composition. Since Pt is more active than Pd in oxidizing $NO_x$ gases, the first oxidation catalyst composition was configured to provide high oxidation activity. The second oxidation catalyst composition provided lower oxidation activity than the first catalyst composition.

Two regions of a substrate were identified. The first oxidation region included a first subset of the plurality of passageways of the substrate positioned as a concentric core of the circular substrate used. The second oxidation region included a second subset of the plurality of passageways of the substrate positioned as an annular outer region surrounding the core (i.e., the first oxidation region). See, e.g., the embodiment illustrated in FIG. 3A. The ratio of the number of passageways in the first oxidation region to the number of passageways in the second oxidation region was about 1:1.

The second catalyst composition was coated on the substrate in both the first oxidation region and the second oxidation region, and the first catalyst composition was only coated on the substrate in the first oxidation region (e.g., FIG. 5E for the first oxidation region, and FIG. 6A for the second oxidation region). As such, the entire catalyst substrate was first coated with the second catalyst composition according to conventional catalyst washcoat coating methods (i.e., the substrate was dipped into a slurry of the second catalyst composition, dried, and then calcined overnight). The entire axial length of each passageway of the second oxidation region and the first oxidation region were coated with the second oxidation catalyst.

The passageways of second oxidation region (i.e., the region having low oxidation activity and intended to only be coated with the second oxidation catalyst) were then masked with tape.

The masked substrate was then coated with the first catalyst composition according to conventional catalyst washcoat coating methods. Since the passageways of the second oxidation region have been masked, when the substrate is dipped into the first oxidation catalyst slurry, only the passageways of the first oxidation region (i.e., the unmasked passageways) received a layer of the first oxidation catalyst.

The masked substrate was dipped into the first catalyst composition slurry, inlet end first, to within approximately ½ inch from the outlet end of the substrate. The substrate was then flipped and the first catalyst composition slurry was allowed to drain back into the dip pail. The substrate was then cleared of excess washcoat with high pressure air. The tape covering the annular second oxidation region was then removed and the substrate was placed in a horizontal dryer to dry. The substrate was then calcined.

Example 2

The $NO_2/NO_x$ ratio of exhaust gas leaving the catalytic article prepared according to Example 1 was measured at different exhaust gas inlet temperatures. The $NO_2/NO_x$ ratios of exhaust gas leaving the catalytic article prepared according to Example 1 were compared to the $NO_2/NO_x$ ratios of exhaust gas leaving a conventional DOC catalytic article (i.e., no radial coating). The conventional DOC consisted of an inlet zone with PGM on alumina support at a PGM loading of 30 g/ft³ with a Pt:Pd ratio of 1:2. The outlet zone of the conventional DOC was coated with PGM on alumina support with PGM loading of 10 g/ft³ with a Pt:Pd ratio of 5:1.

The $NO_2$/NOx ratios of exhaust gas leaving the catalytic article prepared according to Example 1 were measured for three different exhaust mass flow rates: (i) 30 k/h space velocity (SV); (ii) 45 k/h SV; and (iii) 90 k/h SV. The $NO_2$/NOx ratios of exhaust gas leaving the conventional DOC catalytic article (no radially zoned coating) were measured for the exhaust mass flow rate of 90 k/h SV.

Figure 8:
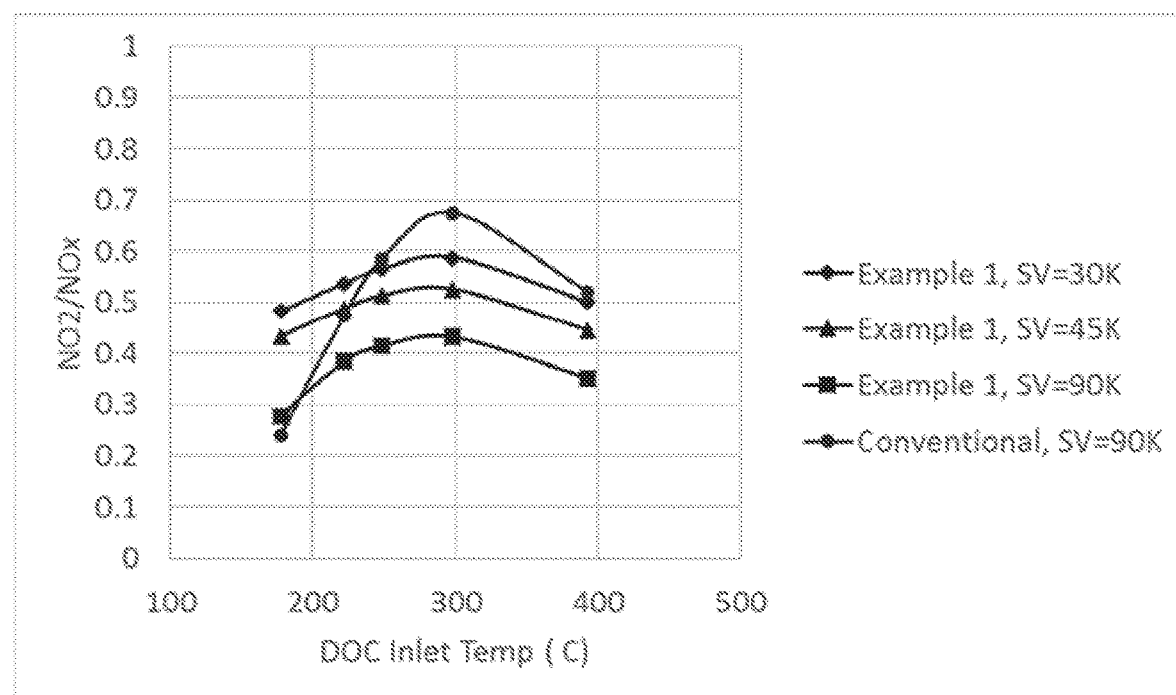
FIG. 8 is a graph illustrating the NO$_2$/NO$_x$ ratio of exhaust gas leaving catalytic articles over a range of temperatures.

The graph shown in FIG. 8 of the present application shows the $NO_2$/NOx ratios of exhaust gas leaving the catalytic articles vs. DOC inlet temperature. Modelling software was used to generate the graphs for the radially zoned catalytic article and the conventional DOC catalytic article. The curvier line shows the results for a conventional DOC catalytic article. The three flatter lines show the results for the radially zoned catalytic article of the present disclosure at the different exhaust mass flow rates.

As evidenced by the relatively more linear nature of the $NO_2$/NOx ratio for the radially zoned catalytic article according to Example 1, the unique positioning of a relatively high oxidation catalyst composition and a relatively low oxidation catalyst composition provides a relatively stable $NO_2$/NOx ratio of exhaust gas leaving the radially zoned catalytic article (i.e., the $NO_2$/NOx ratio does not significantly fluctuate with DOC inlet temperature) as compared to the $NO_2$/NOx ratio of exhaust gas leaving the conventional DOC catalytic article.

Example 3

A radially coated DOC was manufactured with a coating of PGM at a Pt:Pd ratio of 5:1 in the center portion of the part. A Pd only coating was applied to the annular region of the part. A reference part was manufactured with zoning along the axial axis of the part. The inlet zone had a Pt:Pd ratio of 1:2 and the outlet zone had a Pt:Pd ratio of 5:1.

Samples were tested on a 6.7 L engine operated such that the gas space velocity was 100K/hr. The engine was operated at various torques to result in DOC inlet temperatures ranging from 175° C. to 400° C. A sample of gas was continuously extracted from the outlet side of the DOC and analyzed for NO, $NO_2$ and NOx concentration using an FTIR analyzer.

Figure 9:
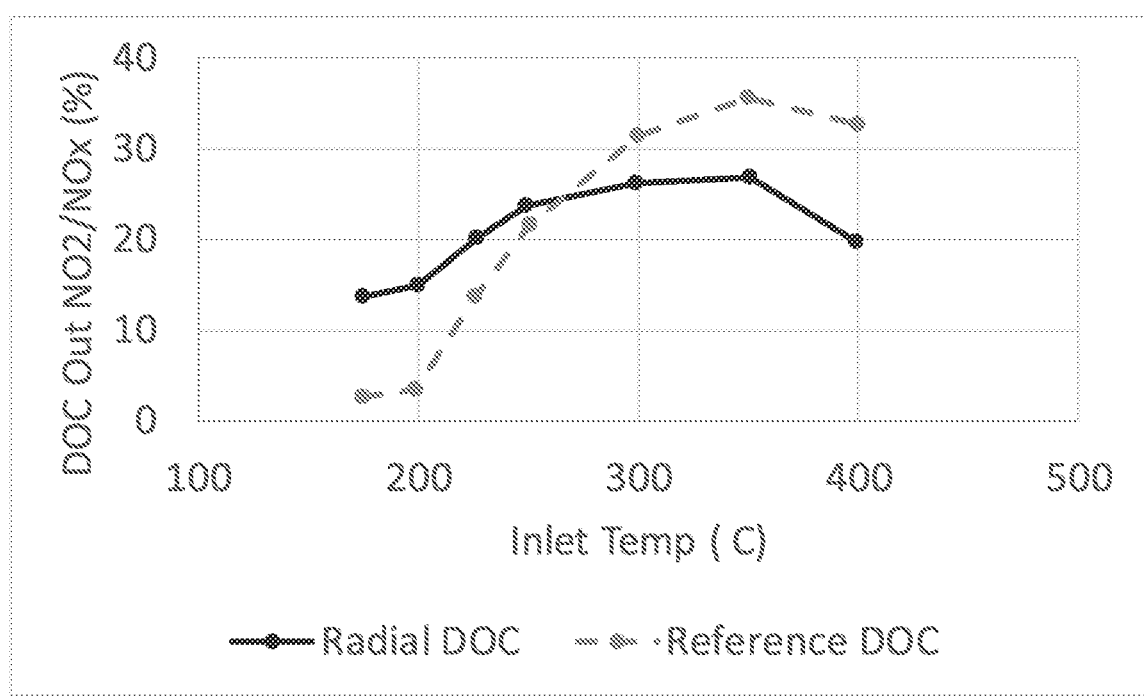
FIG. 9 is a graph illustrating the $NO_2/NO_x$ ratio of exhaust gas leaving a DOC over a range of temperatures.

Results are shown in FIG. 9. The radially coated DOC shows less variation in $NO_2$/NOx ratio across the entire testing temperature range.

Many modifications and other embodiments will come to mind to one skilled in the art to which this disclosure pertains having the benefit of the teachings presented in the foregoing description. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A catalytic article, comprising:
   a substrate comprising an inlet side, an outlet side, and a plurality of passageways extending from the inlet side to the outlet side such that an exhaust gas can enter the inlet side of the substrate and exit the outlet side of the substrate, wherein the catalytic article comprises a first oxidation region comprising a first subset of said plurality of passageways and a second oxidation region comprising a second subset of said plurality of passageways;

a first catalyst composition coating at least a portion of each passageway of the first oxidation region, the first catalyst composition comprising at least one platinum group metal (PGM) component and a first support material on which the at least one PGM component is supported; and a second catalyst composition coating at least a portion of each passageway of the second oxidation region, the second catalyst composition comprising at least one platinum group metal (PGM) component and a support material on which the at least one PGM component is supported;

wherein the ratio of the number of passageways of the first oxidation region to the number of passageways of the second oxidation region are in the range of about 10:90 to about 90:10; and wherein the first catalyst composition comprises platinum and the weight ratio of Pt:Pd in the first catalyst composition is greater than the weight ratio of Pt:Pd in the second catalyst composition, wherein:

a) one of the first and second oxidation regions is a centrally located region and the other of the first and second oxidation regions is an annular region, when the substrate is viewed from the inlet end, or b) wherein one of the first and second oxidation regions is a pie wedge region and the other of the first and second oxidation regions is the remaining region of the substrate when the substrate is viewed form the inlet end, or c) wherein the first catalyst composition and the second catalyst composition are in a layered configuration in one or both of the first oxidation region and the second oxidation region.

2. The catalytic article of claim 1, wherein the weight ratio of Pt:Pd in the first catalyst composition is about 1:0 to about 1:1.

3. The catalytic article of claim 1, wherein the first catalyst composition comprises a total PGM loading from about 0.5 to about 200 g/ft³.

4. The catalytic article of claim 1, wherein the weight ratio of Pt:Pd in the second catalyst composition is about 0:1 to about 1:1.

5. The catalytic article of claim 1, wherein the second catalyst composition comprises a total PGM loading from about 0.5 to about 200 g/ft³.

6. The catalytic article of claim 1, wherein the support material of one or both of the first catalyst composition and the second catalyst composition comprises a refractory metal oxide.

7. The catalytic article of claim 6, wherein the refractory metal oxide is selected from the group consisting of alumina, titania, zirconia, mixtures of alumina with one or more of titania, zirconia and ceria, ceria coated on alumina, titania coated on alumina, silica-alumina, aluminosilicates, alumina-zirconia, and alumina-ceria.

8. The catalytic article of claim 1, wherein one or both of the first catalyst composition and the second catalyst composition comprises a zeolite.

9. The catalytic article of claim 8, wherein the zeolite is selected form the group consisting of faujasite, chabazite, clinoptilolite, mordenite, silicalite, zeolite X, zeolite Y, ZSM-5 zeolite, offretite, and beta zeolite.

10. The catalytic article of claim 1, wherein the substrate comprises a ceramic material selected from the group consisting of cordierite, mullite, cordierite-α alumina, silicon carbide, silicon nitride, zircon mullite, spodumene, alumina-silica magnesia, zircon silicate, sillimanite, magnesium silicates, zircon, petalite, a alumina, aluminosilicate, or any combination thereof.

11. The catalytic article of claim 1, wherein the substrate comprises a metallic material.

12. The catalytic article of claim 1, wherein for c) the first catalyst composition is layered on top of the second catalyst composition in the first oxidation region.

13. The catalytic article of claim 1, wherein for c) the second catalyst composition is layered on top of the first catalyst composition in the second oxidation region.

14. The catalytic article of claim 1, wherein for c) the second catalyst composition is coated on the substrate in both the first oxidation region and the second oxidation region and the first catalyst composition is only coated on the substrate in the first oxidation region.

15. The catalytic article of claim 1, wherein at least one of the first catalyst composition and the second catalyst composition are laterally zone-coated with a third catalyst composition.

16. The catalytic article of claim 1, wherein the substrate is a monolithic flow-through substrate having a plurality of parallel passageways open to fluid flow.

17. The catalytic article of claim 1, wherein the substrate is a wall-flow substrate such that the plurality of passageways include a porous wall portion.

18. An exhaust gas treatment system for an internal combustion engine comprising the catalytic article of claim 1, wherein the catalytic article is downstream of and in fluid communication with the internal combustion engine.

19. The exhaust gas treatment system of claim 18, further comprising one or more catalytic articles selected from the group consisting of a selective catalytic reduction (SCR) catalyst, a soot filter, an ammonia oxidation ($AMO_x$) catalyst, and a lean-$NO_x$ trap (LNT).

20. A method for treating an exhaust gas stream comprising hydrocarbons, carbon monoxide, and NON, the method comprising passing the exhaust gas stream through the catalytic article of claim 1.

* * * * *